United States Patent [19]

Lucas et al.

[11] Patent Number: 4,635,949
[45] Date of Patent: Jan. 13, 1987

[54] CYLINDER-HEAD GASKET

[75] Inventors: Jacques D. H. Lucas; Dominique H. P. M. Samson, both of Oullins, France

[73] Assignee: Societe Anonyme Curty, Rhone, France

[21] Appl. No.: 268,852

[22] Filed: Jun. 1, 1981

[30] Foreign Application Priority Data

Jun. 2, 1980 [FR] France ............................ 80 12478

[51] Int. Cl.⁴ ............................................. F16J 15/12
[52] U.S. Cl. ............................. 277/235 B; 277/211; 277/233
[58] Field of Search ............. 277/235 B, 211, DIG. 6, 277/233, 234, 235 R

[56] References Cited

U.S. PATENT DOCUMENTS 3,324,087  6/1967  Smith et al. ................. 277/DIG. 6
3,473,813  10/1969  Meyers et al. ................. 277/235 B
3,490,776  1/1970  Avery ................................ 277/211
3,811,689  5/1974  Farnam ......................... 277/235 B
4,312,512  1/1982  Conte ............................. 277/235 B

FOREIGN PATENT DOCUMENTS 1017416  10/1957  Fed. Rep. of Germany ... 277/235 B

Primary Examiner—Robert S. Ward
Attorney, Agent, or Firm—Karl F. Ross; Herbert Dubno

[57] ABSTRACT

A cylinder-head gasket has a sheet formed of a rigid organic and substantially nonthermoplastic material such as phenylene polysulfide that does not soften at engine-operating temperatures of 130° C.–150° C. The sheet has a plurality of gas-passage holes and liquid-passage holes. Respective elastomeric seals are secured to the edges of the liquid-passage holes and respective metallic seal rings are secured to the edges of the gas-passage holes.

10 Claims, 11 Drawing Figures

CYLINDER-HEAD GASKET

FIELD OF THE INVENTION

The present invention relates to a cylinder-head gasket of the type used in an internal-combustion engine between the cylinder head and the block.

BACKGROUND OF THE INVENTION

A cylinder-head gasket is compressed between the cylinder head and engine block of an internal-combustion engine and is formed with cylinder or gas-passage holes, with bolt or stud holes, and with liquid-passage holes. The purpose of the head gasket is to maintain a predetermined spacing between the cylinder head and the engine block and to prevent leakage between the various passages extending through the gasket and from these holes to the exterior. Obviously the head gasket is subjected to considerable pressure, heat, and even chemical action.

It is therefore standard practice to form such a head gasket of asbestos or metal-clad asbestos. The standard procedure on assembling a cylinder head is to torque it down with the required force during assembly, and thereafter at regular intervals for a short run-in period to torque it down again, ensuring that constant pressure is maintained as the gasket flattens out and conforms to the surfaces it is sandwiched between.

Such an asbestos cylinder-head gasket is therefore disadvantageous in several respects. The use of asbestos itself demands expensive manufacturing techniques in order to protect those involved in the manufacture from this dangerous material. The retorquing of the cylinder head is also an onerous operation which, if forgotten, can result in serious damage to the engine.

Accordingly it has been suggested to use a metallic head gasket having elastomeric seal rings around the liquid-passage holes through which coolant water normally passes. Different metallic seal rings are provided around the edges of the gas-passage holes constituting the ends of the engine cylinders. Such a gasket need not be retorqued, but fabrication costs for it are quite high.

In French patent No. 79 08917 a head gasket is described which is made of a synthetic resin or of rubber and which incorporates solid spacers which ensure proper spacing of the cylinder head and block. Such a head gasket, however, has been found to be extremely prone to failure in engines operating at high temperature, as many of the modern high-RPM fuel-efficient ones do. At the high temperatures of around 130° C.–150° C. this gasket softens so much that it easily blows out.

Thus a procedure has been developed of incorporating a metal skeleton in such a gasket. Appropriate portions of the gasket are made of metal, and metallic rings are incorporated in it around the various holes. Although such a gasket can function adequately, its fabrication costs are quite high, particularly because of the considerable material losses inherent in its production from a flat continuous metal blank and the difficulty of positioning the various metallic elements in the mold for the gasket.

OBJECTS OF THE INVENTION

It is therefore an object of the present invention to provide an improved cylinder-head gasket.

Another object is the provision of such a gasket which can be produced at relatively low cost and which nonetheless functions well without retorquing during run-in.

SUMMARY OF THE INVENTION

These objects are attained according to the instant invention in a cylinder-head gasket comprising a sheet formed of a rigid organic and substantially nonthermoplastic material and having a plurality of bolt or stud holes, a plurality of gas-passage holes having edges, and a plurality of liquid-passage holes having edges. Respective elastomeric seal rings are secured to the edges of the liquid-passage holes. Metallic seal rings are secured to the edges of the gas-passage holes.

The use of a substantially nonthermoplastic material, ty which is meant a material that does not soften at an engine temperature of 130° C.–150° C., ensures that the gasket according to this invention will not flatten, and therefore that it will maintain the cylinder head and engine block at a fixed spacing. The elastomer of the seal rings at the liquid-passage holes is of the same temperature stability, and serves merely as a seal, since the spacing function is carried out by the harder material of the sheet.

According to further features of this invention the sheet is formed of a synthetic resin that is either injection molded, pressure molded, or transfer molded. The resin may be a thermosetting resin, or a thermoplastic resin with a high softening point such as phenylene polysulfide. It may be filled with fibers of glass, carbon, asbestos, or mineral as well as with a polymer-compatible filler such as chalk, carbon black, or the like.

As compared to a gasket made of a flexible polymer, the instant invention can be manufactured to high tolerances. The temperature-resistant resins used according to the instant invention all shrink very little after molding, so that a good fit can be ensured.

In accordance with another feature of this invention the sheet is continuous and of uniform thickness. It is also possible to make it thicker at the hole edges than therebetween to ensure proper compression of the seal rings at these critical locations. Finally it is within the scope of this invention to even make the sheet of a plurality of segments joined together at the hole edges.

The sheet may be formed between its outer periphery and each gas-passage hole with a groove which conducts any gas leaked out to the exterior.

The edges of the liquid-passage holes according to this invention extend perpendicular to the sheet and the seal rings are adhered butt-fashion, that is in flat surface contact, to these edges. It is also possible to form the sheet with respective annular grooves surrounding the liquid-passage holes, and to seat the elastomeric seal rings in these grooves. Similar grooves may be formed around the gas-passage holes and the metallic seals may be of U-section with legs engaged flatly on the opposite sides of the sheet over the respective annular grooves.

The metallic seal ring according to this invention may also be formed as an elastomeric annular core surrounded by a metallic sheathing. Such a structure has the advantage of at least limited compressibility and high resistance to heat and chemical attack.

DESCRIPTION OF THE DRAWING

The above and other features, objects, and advantages will become more readily apparent from the following, reference being made to the accompanying drawing in which.

SPECIFIC DESCRIPTION

Figure 1:
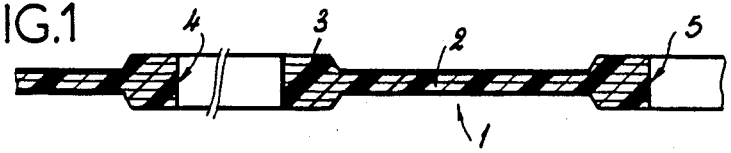
FIG. 1 is a section through a portion of a cylinder-head gasket according to this invention.

As seen in FIG. 1 a cylinder-head gasket according to the instant invention comprises a rigid polymer sheet 1 formed of phenylene polysulfide and having thin—less than 1.5 mm—regions 2 and thick—between 1 mm and 3 mm—regions 3. The sheet 1 is formed with liquid-passage holes 4, gas-passage holes 5, and bolt or stud holes 11 (see FIG. 10).

Figure 2:
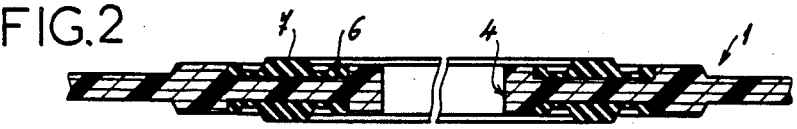
FIGS. 2–4 are sections through head gaskets according to this invention at liquid-passage holes.

FIG. 2 shows how the sheet 1 may be formed around each of its holes 4 with an annular groove 6 in which an annular elastomeric seal ring 7 is seated.

Figure 3:
Figure 4:
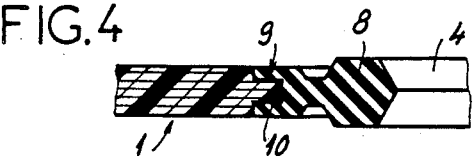

In FIG. 3 an arrangment is shown wherein an elastomeric seal ring 8 is adhered butt-fashion to the edge of the hole 4 and is thicker than the sheet 1 around the hole 4. FIG. 4 shows a similar setup, but wherein the ring 8'0 has a U-section outer periphery and engages over the edge of the hole so that it fits into annular recesses 9 and embraces a central ridge 10. An appropriate heat-resistant adhesive is used to bond the rings 8 to the sheet 1. In any case the elastomeric seal ring 7, or 8 extends beyond the plane of both faces of the sheet 1 so that it is compressed as the gasket is itself compressed between the planar surfaces of the cylinder head and block.

Figure 5:
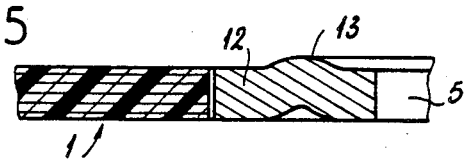
FIGS. 5–9 are sections through head gaskets according to this invention at gas-passage holes.
Figure 6:
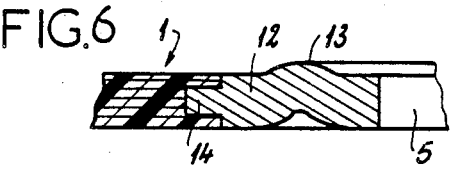

FIG. 5 shows a metallic seal ring 12 of partial U-section, that is with a central bump 13, that lines one of the holes 5. This ring 12 is again secured butt-fashion to the inner edge of the hole 5. In FIG. 6 an arrangement is used wherein a ring similar to the ring 12 has an outwardly projecting ridge 14 received in a corresponding groove formed in the inner edge of the hole 5.

Figure 7:
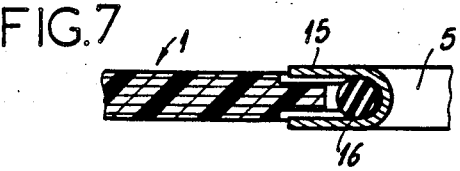

The hole 5 may also, as shown in FIG. 7, be lined with a metallic U-section ring 15 having legs adhered to opposite faces of the sheet 1. An elastomeric ring 16 is provided inside this ring 15, and the ring 15 is sufficiently deformable that it resists crushing of the metal sheathing 16 around it.

Figure 8:
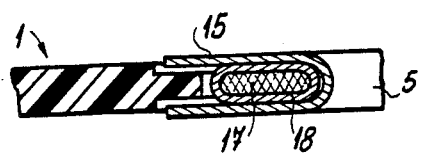

The arrangement of FIG. 8 is similar to that of FIG. 7 except that the U-section ring 15 surrounds a compressible fibrous core ring 17 itself surrounded by a metallic sheathing 18. Such a composite seal can resist very high temperatures.

Figure 9:
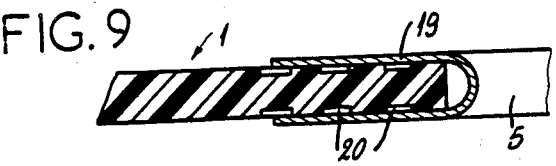

A U-section ring 19 shown in FIG. 9 has its legs overreaching opposite faces of the sheet 1 which is formed around its holes 5 with annular grooves 20 covered by the legs of the U-section ring 19. These grooves 20 can hold an appropriate adhesive.

Figure 10:
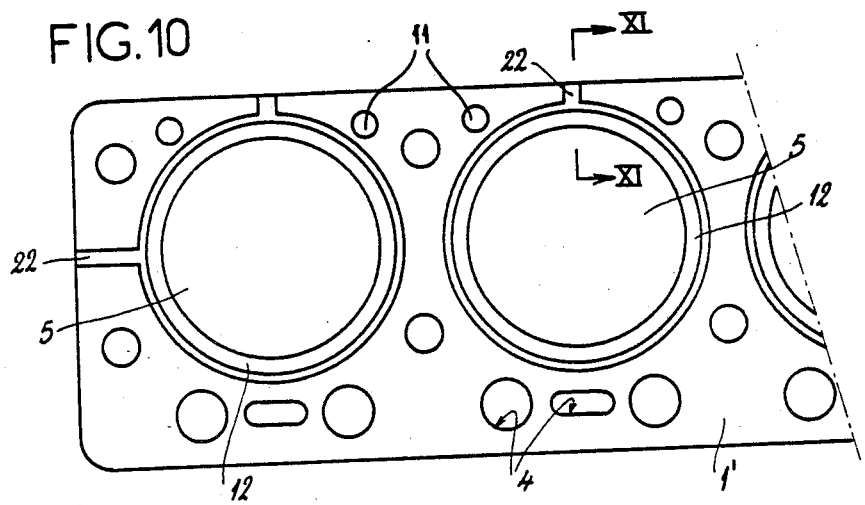
FIG. 10 is a plan view of a gasket according to the present invention.
Figure 11:
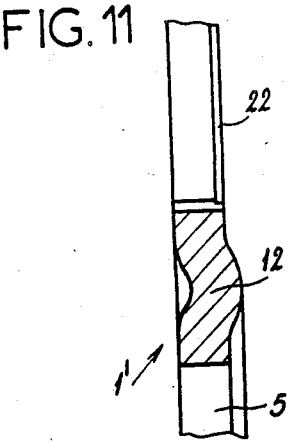
FIG. 11 is a section taken along line XI—XI of FIG. 10.

In FIGS. 10 and 11 a sheet 1' is shown which is formed by a plurality of joined-together segments and which is of uniform thickness, except that it is formed with radial grooves 22 leading out from the metallic rings 12 about its cylinder holes 5. These grooves 22 serve to conduct any leaked-out gas to the exterior.

We claim:

1. A cylinder-head gasket comprising:
   a sheet formed of a rigid organic and substantially nonthermoplastic material and having a plurality of gas-passage holes having edges and a plurality of liquid-passage holes having edges;
   respective elastomeric seal rings secured to said sheet adjacent edges of said liquid-passage holes; and
   respective metallic rings secured to said edges of said gas-passage holes, each of said liquid-passage holes being surrounded by a thick portion of said sheet at said edges and being separated from the thick portion at an edge of another liquid passage by a region which is thinner than said thick portions.

2. The gasket defined in claim 1 wherein said material is a phenylene polysulfide.

3. The gasket defined in claim 1 wherein said material is a thermosetting resin.

4. The gasket defined in claim 1 wherein said material is a synthetic resin filled with fibers.

5. The gasket defined in claim 1 wherein said sheet is formed of a plurality of segments jointed together at said edges.

6. The gasket defined in claim 1 wherein said sheet is injection molded.

7. The gasket defined in claim 1 wherein said sheet is compresion molded.

8. The gasket defined in claim 1 wherein said sheet is transfer molded.

9. A cylinder-head gasket comprising:
   a sheet formed of a rigid organic and substantially nonthermoplastic material and having a plurality of gas-passage holes having edges and a plurality of liquid-passage holes having edges;
   respective elastomeric seal rings secured to said sheet adjacent edges of said liquid-passage holes; and
   respective metallic rings secured to said edges of said gas-passage holes, said sheet being formed with respective annular grooves adjacent the edge of each of said liquid-passage holes, said seal rings being seated in said annular grooves.

10. A cylinder-head gasket comprising:
    a sheet formed of a rigid organic and substantially nonthermoplastic material and having a plurality of gas-passage holes having edges and a plurality of liquid-passage holes having edges;
    respective elastomeric seal rings secured to said sheet adjacent edges of said liquid-passage holes; and
    respective metallic rings secured to said edges of said gas-passage holes, said sheet being formed with respective annular grooves adjacent the edge of each of said liquid-passage holes and receiving a respective elastomeric ring, said metallic rings being of undulating cross section.

* * * * *